(12) United States Patent
Gu et al.

(10) Patent No.: US 8,161,394 B2
(45) Date of Patent: Apr. 17, 2012

(54) CONFIGURABLE METRIC GROUPS FOR PRESENTING DATA TO A USER

(75) Inventors: Yu-Feng Gu, Aurora, CO (US); Lujiang Liu, Highlands Ranch, CO (US); Kimberly Jacot, Highlands Ranch, CO (US); Madhuri Kolhatkar, Englewood, CO (US); Anthony H. Cheng, Littleton, CO (US); Todd F. Jamison, Golden, CO (US); David Nowakowski, Thornton, CO (US); Anna M. O'Kelley, Highlands Rich, CO (US); Cristobal R. Barrera, Littleton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 905 days.

(21) Appl. No.: 11/746,178

(22) Filed: May 9, 2007

(65) Prior Publication Data

US 2008/0163066 A1   Jul. 3, 2008

Related U.S. Application Data

(60) Provisional application No. 60/882,538, filed on Dec. 28, 2006.

(51) Int. Cl.
*G06F 3/00* (2006.01)
(52) U.S. Cl. ....... 715/738; 715/739; 705/7.36; 705/7.37
(58) Field of Classification Search ................... 715/713, 715/714, 738, 739; 705/7.36, 7.37
See application file for complete search history.

(56) References Cited

U.S. PATENT DOCUMENTS

| | | |
|---|---|---|
| 5,537,590 A | 7/1996 | Amado |
| 5,701,400 A | 12/1997 | Amado |
| 6,072,493 A | 6/2000 | Driskell et al. |
| 6,289,382 B1 | 9/2001 | Bowman-Amuah |
| 6,560,569 B1 | 5/2003 | Abu El Ata |
| 7,110,997 B1 | 9/2006 | Turkel et al. |
| 7,149,983 B1 | 12/2006 | Robertson et al. |
| 7,151,438 B1 | 12/2006 | Hall et al. |
| 7,353,464 B1 | 4/2008 | Kundu et al. |
| 7,395,511 B1 | 7/2008 | Robertson et al. |
| 7,499,922 B1 | 3/2009 | Shiverick et al. |
| 7,506,274 B2 | 3/2009 | Zhang et al. |
| 7,613,719 B2 | 11/2009 | Chang et al. |
| 7,694,239 B2 | 4/2010 | Swain et al. |
| 7,707,040 B2 | 4/2010 | Lakhotia et al. |

(Continued)

OTHER PUBLICATIONS

U.S. Appl. No. 11/746,127, filed May 9, 2007, Advisory Action mailed Jul. 30, 2010, 3 pages.

(Continued)

*Primary Examiner* — Andrey Belousov
(74) *Attorney, Agent, or Firm* — Kilpatrick Townsend & Stockton LLP

(57) ABSTRACT

A dashboard application can enable a user to quickly view data (and, in a particular aspect, data from one or more business applications) in an efficient manner. The dashboard application can be used to view data about one or more metrics that reflect the performance of a business, as derived from data maintained (perhaps in an associated data store) by the business application(s). In an aspect, a user can select two or more metrics to be displayed on a summary page and/or can invoke a detail page to view detailed information about one of the two or more metrics.

19 Claims, 11 Drawing Sheets

U.S. PATENT DOCUMENTS

| | | | |
|---|---|---|---|
| 2003/0115188 | A1 | 6/2003 | Srinivasa et al. |
| 2003/0144868 | A1 | 7/2003 | MacIntyre et al. |
| 2004/0015381 | A1* | 1/2004 | Johnson et al. ............ 705/8 |
| 2004/0049477 | A1 | 3/2004 | Powers et al. |
| 2004/0073468 | A1 | 4/2004 | Vyas et al. |
| 2005/0114206 | A1 | 5/2005 | Bennett et al. |
| 2006/0089939 | A1 | 4/2006 | Broda et al. |
| 2006/0206837 | A1 | 9/2006 | Steiner |
| 2007/0061283 | A1 | 3/2007 | Lakhotia et al. |
| 2007/0203902 | A1 | 8/2007 | Bauerle et al. |
| 2008/0162209 | A1 | 7/2008 | Gu et al. |
| 2008/0162210 | A1 | 7/2008 | Gu et al. |
| 2008/0163099 | A1 | 7/2008 | Gu et al. |
| 2008/0163125 | A1 | 7/2008 | Gu et al. |

OTHER PUBLICATIONS

U.S. Appl. No. 11/746,154, filed May 9, 2007, Final Office Action mailed Aug. 18, 2010, 26 pages.

U.S. Appl. No. 11/746,216, filed May 9, 2007, Office Action mailed Jun. 23, 2010, 25 pages.

U.S. Appl. No. 11/746,103, filed May 9, 2007, Office Action mailed Mar. 30, 2010, 16 pages.

U.S. Appl. No. 11/746,154, filed May 9, 2007, Office Action mailed Mar. 11, 2010, 21 pages.

U.S. Appl. No. 11/746,127, filed May 9, 2007, Office Action mailed Dec. 22, 2009, 18 pages.

U.S. Appl. No. 11/746,127, filed May 9, 2007, Final Office Action mailed May 25, 2010, 18 pages.

Denton, D. Keith, "Focus on Data Context, Not Content," Communications News, Dec. 2003, vol. 40, Issue 12, p. 50.

U.S. Appl. No. 11/746,103, filed May 9, 2007, Final Office Action mailed Aug. 30, 2010, 17 pages.

U.S. Appl. No. 11/746,216, filed May 9, 2007, Final Office Action mailed Dec. 17, 2010, 28 pages.

U.S. Appl. No. 11/746,103, filed May 9, 2007, Office Action mailed Apr. 7, 2011, 19 pages.

* cited by examiner

CONFIGURABLE METRIC GROUPS FOR PRESENTING DATA TO A USER

CROSS-REFERENCE TO RELATED APPLICATIONS

This application may be related to the following patents/applications:

This application is a nonprovisional application claiming, under 35 U.S.C. §119(e), the benefit of the filing date of provisional U.S. Patent Application No. 60/882,538, filed Dec. 28, 2006 by Gu et al. and entitled "Dashboard Application," the entire disclosure of which is incorporated herein by reference.

This application is related to co-pending U.S. patent application Ser. No. 11/746,103, filed May 9, 2007, by Gu et al. and entitled "Drill Down Functionality in a Dashboard Application", the entire disclosure of which is incorporated herein by reference.

This application is related to co-pending U.S. patent application Ser. No. 11/746,154, filed May 9, 2007, by Gu et al. and entitled "Multi-Dimensioned Data Hierarchies", the entire disclosure of which is incorporated herein by reference.

This application is related to co-pending U.S. patent application Ser. No. 11/746,127, filed May 9, 2007, by Gu et al. and entitled "Configurable Actions in a Dashboard Application", the entire disclosure of which is incorporated herein by reference.

This application is related to co-pending U.S. patent application Ser. No. 11/746,216, filed May 9, 2007, by Gu et al. and entitled "Configurable Goals in a Dashboard Application", the entire disclosure of which is incorporated herein by reference.

The entire disclosure of each of the above applications/patents is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to providing information to computer users, and in particular to accessing data from business applications and providing that data in an organized manner.

BACKGROUND

Most large businesses (and many smaller businesses and organizations) employ one or more business applications, and in some cases, suites of business applications, to provide visibility and control over various aspects of the business. Such "business applications" (or, as they are sometimes called, "enterprise applications") can include, without limitation, customer relations management ("CRM") applications, enterprise resource planning ("ERP") applications, supply chain management applications, and other applications dealing with various finance, accounting, manufacturing, and/or distribution functions, to name but a few examples. Exemplary enterprise application suites include, without limitation, the Oracle eBusiness Suite and JD Edwards Enterprise One, both of which are available from Oracle Corp.

To maximize the utility of a business application, users need to have visibility into the business processes managed by the business application, to monitor the health (e.g., the efficiency, operational status) of various business processes, and of the enterprise itself. Business applications, however, typically are more focused on managing the business processes (for example, acquiring, generating and processing business data) than on providing immediate visibility into the health of those business processes.

Consequently, many enterprise users either purchase third party business intelligence tools to integrate with the business application and/or suite, or develop their own business intelligence solution. The cost of business intelligence software is expensive (sometimes prohibitively so), however, and the complexity of such tools often requires intimate knowledge of extract-transform-load ("ETL") technology and system integration simply to integrate an off-the shelf business intelligence tool. Similarly, it can be prohibitively expensive and/or time-consuming to develop a business intelligence solution in house, given the complexity of modern business applications and the lack of a preexisting framework within such applications to develop, add or modify such a solution.

Accordingly, there is a need for a more practical tool to provide visibility into business processes. In some cases, it would be helpful if such a tool were to provide real-time (or near real-time) visibility into the business processes. In other cases, it would be beneficial for such a tool to be relatively configurable by an end-user (and/or support staff) to mitigate the expense (both fiscally and chronologically) of developing solutions that fit the needs of the end-user.

BRIEF SUMMARY OF THE INVENTION

In a set of embodiments, the present invention provides a dashboard application, which can enable a user to quickly view data (and, in a particular aspect, data from one or more business applications) in an efficient manner. In a set of embodiments, the dashboard application can be used to view data about one or more metrics that reflect the performance of business operations(s), as derived from data maintained (perhaps in an associated data store) by the business application (s).

In an aspect of some embodiments, the user is given the ability to customize both what data (i.e., which metrics) is displayed and/or the way in which the data is displayed. Merely by way of example, in an embodiment, the dashboard application might comprise a summary screen and one or more detail screens. The summary screen might display summary information about a plurality of metrics, while the detail screen(s) might display more detailed information about one or more particular metrics. The user can be given the option to customize the summary screen (both in terms of which metrics are displayed, and/or how they are displayed), and/or the detail screen(s). In a particular set of embodiments, for example, the user can be given tools both to filter the data displayed (e.g., by "drilling down" into the data using a display hierarchy) and/or to categorize the data (e.g., by selecting one or more view criteria for categorizing the data). In a novel aspect, the user might be given the ability to define the display hierarchy and/or the view criteria to meet that user's particular needs.

The tools provided by various embodiments invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within a business application.

Merely by way of example, a method of displaying data, in accordance with one set of embodiments, might comprise providing a communication component in communication with a business application. Merely by way of example, the communication component may be configured to obtain data from the business application. In some embodiments, the method further comprises displaying a dashboard application for user. The dashboard application, an aspect, might comprise a plurality of visible components (e.g., windows, web pages, HTML frames, portlets, and/or the like), including, without limitation, a first visible component and/or a second visible component.

In some embodiments, these visible components may be configured to display information about one or more metrics. Merely by way of example, the method might comprise providing a first input mechanism (e.g., a pick list, combo box, text input field, and/or the like, to name but a few examples) for the user to identify a first metric to be displayed by the first visible component and/or providing a second input mechanism for the user to identify a second metric be displayed by the second visible component. Input may be received from the user via these input mechanisms. Merely by way of example, the method might comprise receiving, from the user and/or via the first input mechanism, an identification of the first metric to be displayed by the first visible component and/or receiving, from the user and/or via the second input mechanism, an identification of the second metric be displayed by the second visible component.

The method may further comprise obtaining (e.g., from a data store maintained by the business application) a first set of data pertaining to the first metric and/or second set of data pertaining to the second metric. Information about the first metric (which, in an aspect, my comprise and/or be derived from some or all of the first set of data) can be displayed with the first visible component. Similarly, information about the second metric (which my, but need not, be derived from and/or comprise some or all of the second set of data) can be displayed with the second visible component.

In some embodiments, the user may be given the option to view more detailed data about one of the metrics. Merely by way of example, the first visible component might comprise an input mechanism is configured to be selected by the user to invoke a third visible component, which might provide a detailed display of the first set of data. In an aspect, the first and second visible components might be displayed on a first web page (e.g., as frames, portlets, and/or the like), while the third visible component might be displayed on the second one page. Merely by way of example, the input mechanism in the first visible component might be configured to invoke the second one page An exemplary computer system in accordance with another set of embodiments might comprise a processor, a communication interface and/or a computer readable medium. The computer readable medium might comprise (i.e., have stored thereon) a set of instructions executable by the processor. The set of instructions might include instructions to perform various procedures of methods of the invention. In some cases, the computer system might comprise a server computer (e.g., a web server), which might be in communication with a client computer (which might include a web browser and/or a dedicated client application, etc.) to display information for a user and/or receive input from the user.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
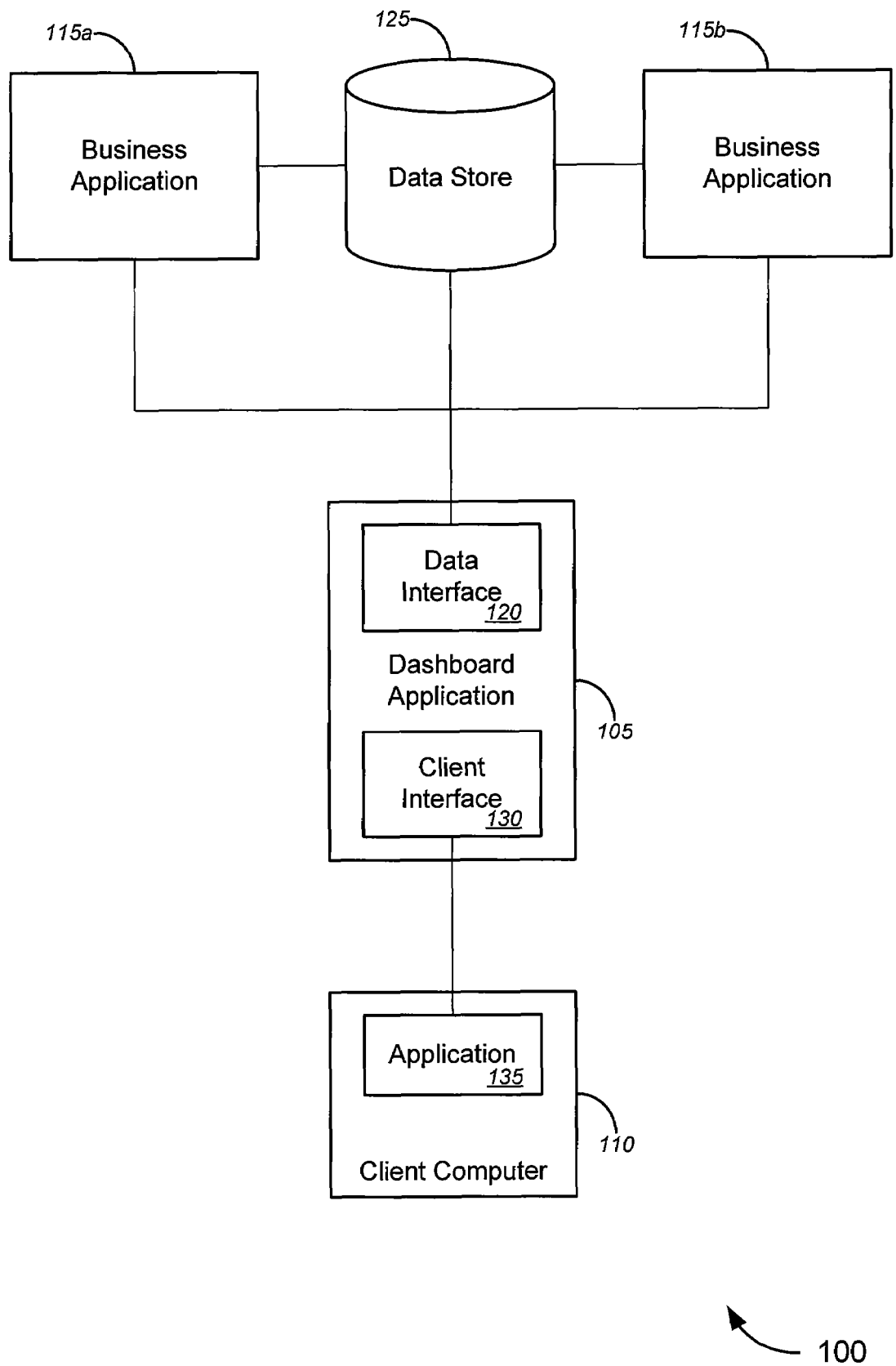
FIG. 1 is a block diagram illustrating a computer system employing a dashboard application, in accordance with various embodiments of the invention.

Embodiments of the invention provide a dashboard application, which interacts both with one or more business applications (and/or the data produced by those applications) and with a user. Hence, the dashboard application provides an easy-to-use facility for a user to view data about various business metrics without having to actually interact with the business applications themselves. One skilled in the art will appreciate that there are a variety of business applications in use, including without limitation, customer relations management applications, enterprise resource planning applications, warehouse management systems, supply chain management applications, human resources applications, business analytics applications, sales applications, and the like. Several vendors provide comprehensive packages of business applications. Examples include the E-Business Suite™, the Fusion™ suite, JD Edwards EnterpriseOne™, and PeopleSoft Enterprise™ (all available from Oracle Corp.™), as well as packages from other vendors, such as the mySAP Buesingess Suite™, available from SAP AG™. The dashboard application, then, provides an interface between the data produced by such business application (and/or the applications themselves) and a user.

Merely by way of example, a Plant Manager Dashboard™ application might provide an interface for a plant manager to view a set of metrics associated with the performance of one or more manufacturing plants. In many cases, a metric will be derived from data produced by one or more business applications, while in other cases, a metric might simply comprise such data. It should be appreciated that data produced by a business application will normally take the form of a number of records (e.g., database records). Each of those records will comprise a plurality of data elements having a value, and each of the data elements will have an associated dimension. In some cases, these records and/or data elements might provide a metric themselves. In other cases, the metric might be derived from a collection of a plurality of records (and/or the data elements therein).

Hence, used herein, the term "metric" means any value that is used to measure the performance of a particular business process. Examples include the number of orders fulfilled, number of products produced, accounts receivable aging, and/or the like. In many cases, a metric will have two or more dimensions, and in some cases, a metric will have a large number of dimensions. In a sense, dimensions provide various perspectives from which a metric can be viewed. Merely by way of example, a metric measuring the number of products produced might have a time dimension (e.g., the number of products produced over a particular week, month, quarter, year, etc.) as well as a plant dimension (e.g., the number of products produced in Plant A, number of products produced in Plant B, etc.). In a set of embodiments, the dashboard application provides a way for users to explore metrics in the dimensions that are of the greatest interest.

In an aspect, the dashboard application of the present invention provides flexibility in viewing metrics (and/or information about those metrics) by implementing a display hierarchy. The display hierarchy can be used to "drill down" into a metric (and/or the data from which the metric is derived) by filtering the data according to one or more dimensions. The hierarchy can also be used to categorize the data according to one or more view criteria (which might also be dimensions). It should be noted that a display hierarchy can be multi-dimensional. Merely by way of example, a particular hierarchy for a metric measuring items produced might have, at its topmost level, a time dimension (e.g., years). The second level in the hierarchy might be a plant location dimension, while the third level might be a product family dimension.

Together, a set of filter criteria and view criteria can be considered a "variant." A variant can be thought of as a particular way to view (and/or drill down into) a metric. In some embodiments, a number of default variants might be provided for viewing data. In other embodiments, the user might be provided with a facility to create user-defined metrics. In yet other embodiments, a combination of default variants and user-defined variants might be employed.

FIG. 1 depicts a system 100 that illustrates a typical relationship between a dashboard application 105, a client computer 110 and one or more business applications 115. (Although two business applications 115 are illustrated on FIG. 1, it should be appreciated that the dashboard application 105 might interface with many business applications.) The dashboard application 105 includes a data interface 120 (which can be thought of as a communication component) for communicating with business applications 115 and/or with one or more data stores 125. The data store(s) 125 (which, in many cases, are databases managed by a relational database management system, such as Oracle 10g™ might be maintained by the business applications 115 and/or might store data produced by the business applications 115. In some embodiments, a single data store 125 might store data associated with multiple business applications 115a, 115b. In other cases, each business application 115 might have its own data store 125. The dashboard application 105 can be in communication with any number of data stores 125, as necessary. In a particular set of embodiments, the data store 125 might comprise a data warehouse, such as a data warehouse managed by Oracle Warehouse Builder™.

The data interface 120 might comprise an application programming interface for communicating with the data store 125 and/or business applications 115. Alternately and/or additionally, the data interface 120 might include a database access component, a web service broker and/or the like. Many inter-application and/or database communication facilities are known in the art, and any of such facilities can be employed by the data interface 120.

The dashboard application 105 also includes a client interface 130 for providing communication between the dashboard application and a client computer 110 (and/or a user thereof). In particular embodiments, the client computer might comprise an application 135 for communicating with the dashboard application 105 (e.g., via the client interface 130). In a particular set of embodiments, the client interface 130 might comprise a web server (which might be part of the dashboard application 105 and/or separate from the dashboard application 105). The application 135, then, might be a web browser 135, which can communicate with the client interface 130 via standard web communications protocols (e.g., HTTP, etc.), and the displays, user interfaces, and/or input mechanisms produced by the dashboard application 105 might be presented to the user as web pages, web-based forms, Java applications and/or applets, portlets, and/or the like. In other embodiments, however, such displays might comprises windows in a dedicated application, etc.

It should be noted that the functional arrangement depicted by FIG. 1 is exemplary in nature, and that many variations are possible. Merely by way of example, in some cases, the dashboard application 105 might be incorporated within one or more of the business applications 115. Similarly, the client interface 130, as mentioned above, might be a standalone program separate from the dashboard application 105 (and, in fact, might reside on a different computer). In one embodiment, the dashboard application 105 resides on a server computer (such as one of those described below, for example). In another embodiment, the dashboard application (and/or a portion thereof) might reside on the client computer 110, such that the user does not have to contact a separate server to use the dashboard application. It should be appreciated, based on the disclosure herein, that the various functional arrangements between the dashboard application 105, business applications 115, data store 125, and client computer 110 are virtually unlimited, and embodiments of the invention are not limited to any particular structural implementation.

Figure 2A:
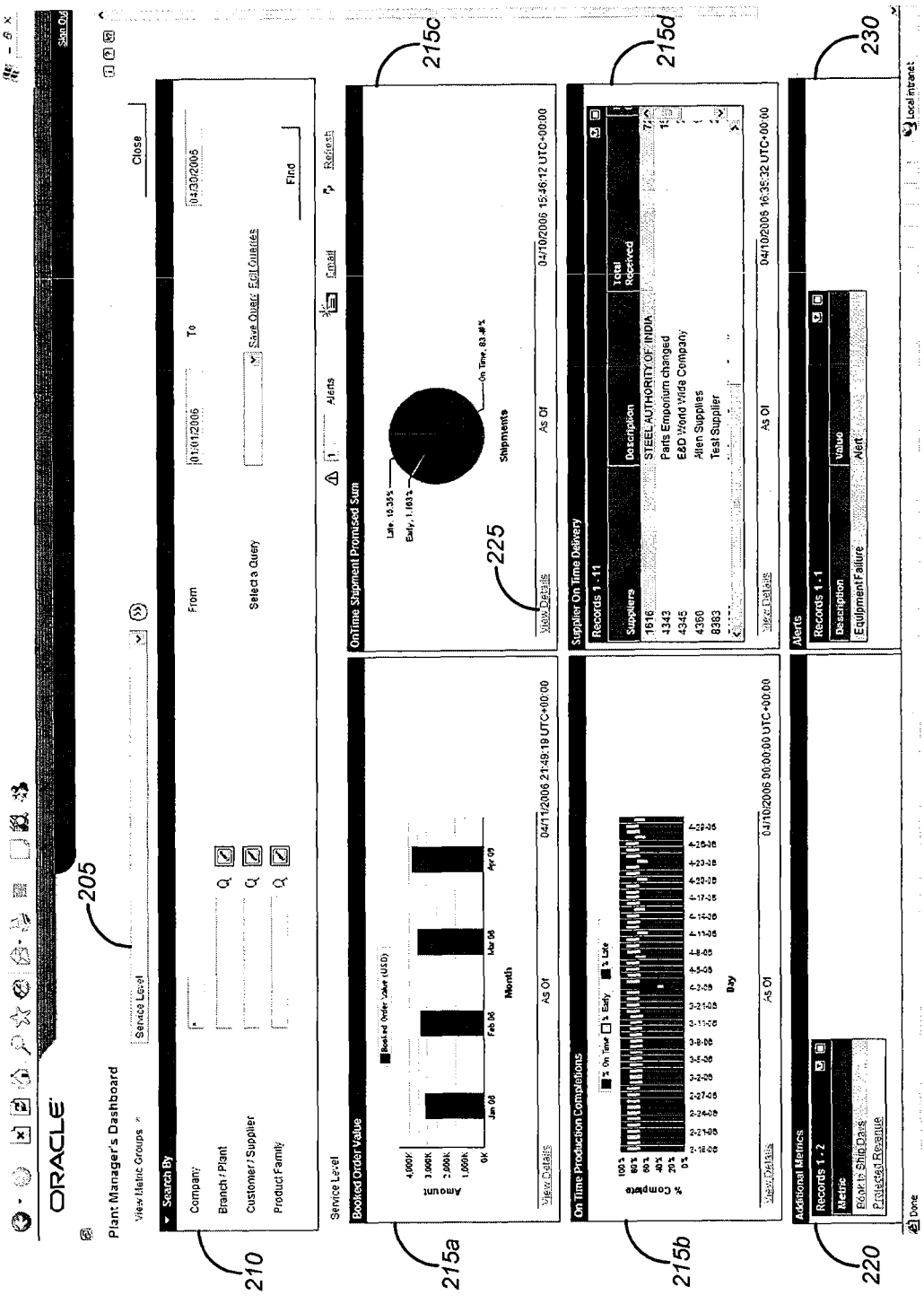
FIG. 2A is screen capture diagram illustrating a metric summary screen from a dashboard application, in accordance with various embodiments of the invention.
Figure 2B:
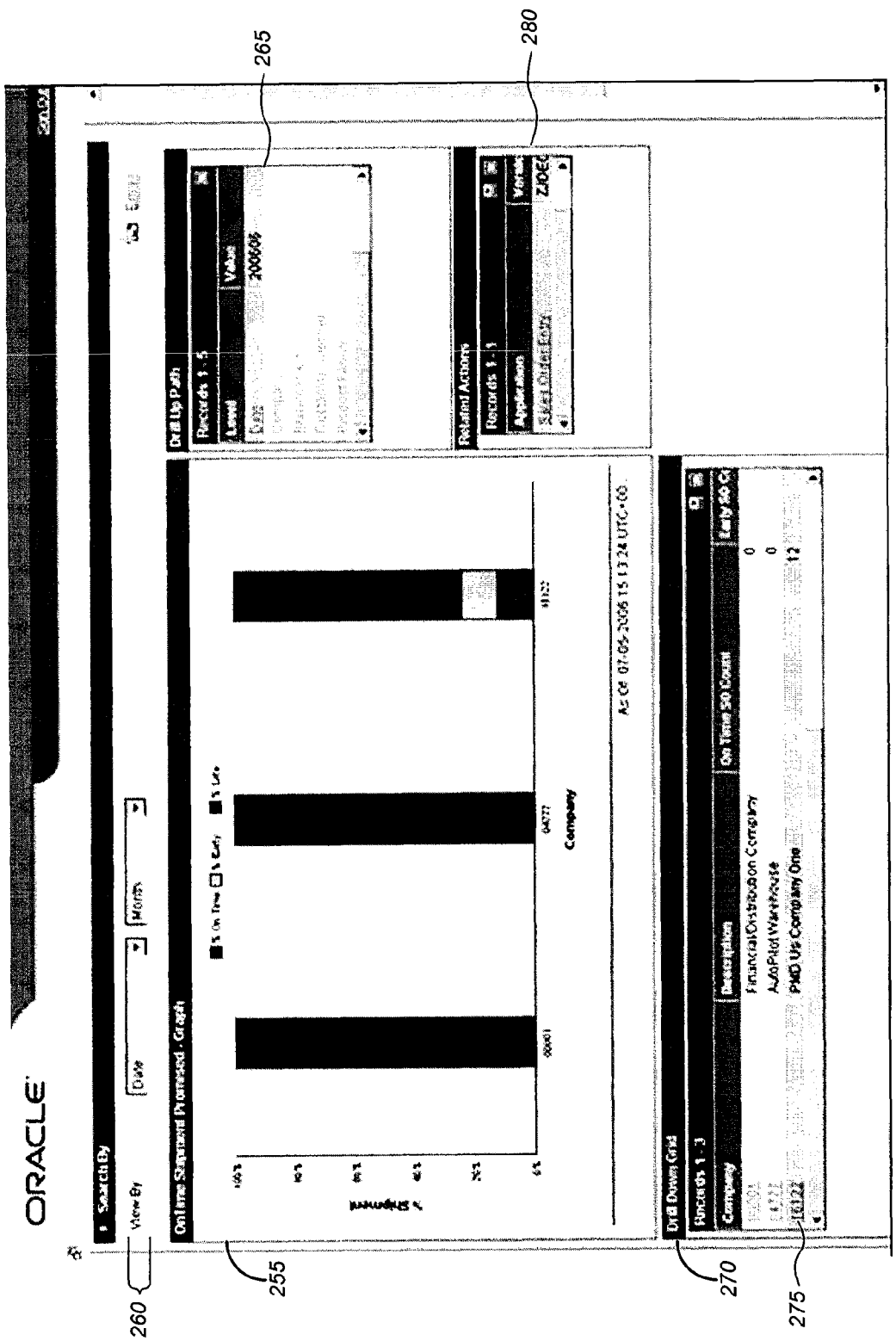
FIG. 2B is screen capture diagram illustrating a metric detail screen from a dashboard application, in accordance with various embodiments of the invention.

As noted above, in a set of embodiments, the dashboard application might provide a summary screen and/or one or more detail screens. Merely by way of example, FIG. 2A illustrates an exemplary summary screen 200, while FIG. 2B illustrates an exemplary detail screen 250. The summary screen 200 comprises a number of visible components, including without limitation a metric group selection interface 205, which will be described in more detail below, a search interface 210, a plurality of metrics components 215, a component 220 for viewing additional metrics not pictured on the summary screen 200, and an alerts component 230, which will also be described in more detail below. A "visible component" can be any component of the dashboard application that is visible, or can be made visible, to a user. Hence, the visible components of the dashboard application collectively provide the user interface for the dashboard application. The nature of a visible component necessarily will depend on the implementation of the dashboard application. Merely by way of example, if the dashboard application is provided as a web-based application, a visible component might comprise, inter alia, a frame on a web page, a Java or Javascript window, a portlet, and/or merely a section of a web page. If the dashboard application is a dedicated application on a client computer, each visible component might be an application window, portion of an application window, dialog box, etc. Based on the disclosure herein, those skilled in the art will appreciate that modern application development environments provide a number of user interface widgets that can be used to create the visible components, as well as other user interfaces and input mechanisms described herein.

The search interface 210 can be used to filter a data set according to one or more dimensions (e.g, as illustrated, by company, by branch/plant, by customer/supplier, by product facility, by date, and/or by text query). Based on the input to the search interface 210, the data displayed in the metric components 215 will be filtered to match the search criteria.

Each metric component 215 displays summary information about a particular metric. Merely by way of example, a first metric component 215*a* displays information about a metric measuring booked order values, while a second metric component 215*b* displays summary information about a metric measuring on-time product completions. The metrics displayed are based on data obtained from a data store associated with one or more business applications and/or from the business applications themselves. In some cases, the dashboard application is configured to generate the appropriate metrics based on raw data obtained from the data store/business application, while in other cases, the dashboard application merely formats and displays metrics data that is stored by the data store itself.

Different metric components 215 might have different display modes. Merely by way of example, various metric components might employ a bar chart (e.g., component 215*a*), a pie chart (e.g., component 215*c*), a stacked bar chart (e.g., component 215*b*) and/or a data table (e.g., component 215*d*). It should be appreciated that the display mode for a particular metric will often be chosen based on the type of metric and the most efficient way to convey information about that metric. (As described below in detail, the user can be given the opportunity to specify both the metrics that appear on the summary screen 200, and/or the display mode for each of those metrics). In a particular aspect, the user can select pre-selected groups of metrics to appear on the display screen, using the metric group selection interface 205, as described further below.

Each metric component 215 also includes an input mechanism (e.g., the mechanism 225 displayed in metric component 215*c*) to allow the user to invoke a detail screen providing a detailed view of that metric (and/or data pertaining to that metric). (While the mechanism 225 illustrated in FIG. 2 is a hyperlink, one skilled in the art will appreciate, based on the disclosure herein, that any number of input mechanisms could be used for this purpose, e.g., dialog boxes, buttons, etc.). Merely by way of example, which a user provides input via the input mechanism 225 (e.g., by selecting the hyperlink), the dashboard application will invoke a detail screen, such as the detail screen 250 illustrated by FIG. 2B.

The detail screen 250 provides more detailed information about the selected metric, and it also allows the user to view the metric data (and/or the data from which the metric is generated) more selectively, for example, by filtering and/or categorizing the data by various dimensions. In the example illustrated by FIG. 2B, the detail screen 250 comprises a first visible component 255 for displaying the metric. (It should be noted that similar display modes as those on the summary screen, described above, may be used to display the metric on the detail screen, although other display modes may be used as well. In particular, as illustrated by FIGS. 2A and 2B, a first display mode (e.g., a mode comprising a pie chart) might be employed for a particular metric 215*c* on the summary screen 200, while a second display mode (e.g., a mode comprising a bar chart) might be used in the visible component 255 displaying the metric on the detail screen 250. In some embodiments, the detail screen 250 might have an input mechanism (not shown on FIG. 2B) for selecting among various display modes for the display of the metric in the visible component 255.

The exemplary detail screen 250 also comprises an input mechanism 260 for identifying a view criterion. The selection of the view criterion generally will affect how the metric is displayed, but not necessarily the data that is displayed. In other words, the view criterion affects how the metric is displayed (e.g., how the data is categorized), but not what is displayed. In this example, changing the view criterion will change the X-axis of the bar chart to categorize the data according to the view criterion.

The detail screen 250 also includes a visible component 265 that displays a display hierarchy for the data comprising the metric. This display hierarchy allows a user to drill down into the metric data according to one or more dimensions. As used herein the terms "drill down" and "drill up" refers to moving between levels within a display hierarchy. Specifically, a move from a current level in the display hierarchy to a higher level is referred to as "drilling up," while a move from a current level to a lower level is referred to as "drilling down." Generally, drilling down narrows the data presented on the metric (e.g., by filtering the data presented) and drilling up increases the data included in the presentation (e.g., by removing filters).

The display hierarchy component 265 displays the levels of the currently selected display hierarchy, and shows the user the current drill down/drill up path. It should be noted that the levels in the display hierarchy can be associated with different dimensions—as illustrated by FIG. 2B, the top level in the display hierarchy comprises a parameter with a date dimension, while the second level corresponds to a parameter with a company dimension, the third level corresponds to a parameter with a branch plant dimension, and so on.

In conjunction with the display hierarchy, the detail screen also provides another visible component 270 that provides a drill down grid for a currently selected level in the display hierarchy. Generally, the drill down grid will display all of the values in the data set for the parameter corresponding to the selected level of the display hierarchy. For example, for the company level in the display hierarchy, the drill down grid component 270 provides three different companies by which the data can be further filtered. The drill down grid component 270 also provides an input mechanism to allow the user to select one (or more) of the values as a filter criterion. In the illustrated embodiment, for example, the drill down grid component provides an input mechanism 275 (in the form of a hyperlink, in this case) that allows the user to select a value for the company parameter. This value, then, will be used to filter the data that is displayed; in other words, the value will be used as a filter criterion to drill down further into the data.

In addition, the display hierarchy component 265 and/or the drill down grid 270 can be used to provide a view criterion by which the data should be categorized for display (as illustrated by FIG. 2B), in which the metric display component 255 has categorized the metric data by company value. Merely by way of example, if a user selects a particular level in the display hierarchy but does not provide any filter criterion for that level, the dashboard application might be configured to use the parameter associated with that level as the view criterion, and the metric display component 255 might be updated accordingly. Alternatively, the user might be provided with an input mechanism to produce this result. (This can be used as an alternative and/or in addition to the view criterion input mechanism 260 described above.)

The display hierarchy component 265 might include a drill down/drill up path, which indicates how far the user has currently drilled down into the display hierarchy. Optionally, the display hierarchy component 265 can also provide an indication of the values that have been used as filter criteria and/or view criteria in reaching the current drill down level. Merely by way of example, in the illustrated embodiment, the user has selected the date 200606 as a filter criteria, and that value is indicated on the display hierarchy component. In this way, the user can quickly and easily see how the data has been filtered and/or categorized in producing the current display of the metric. The drill down/drill up path, in a novel aspect of some embodiments, can also be used to provide an input mechanism to allow a user to arbitrarily choose a level in the display hierarchy without having to first drill up (or, in some cases, down) to that level. Merely by way of example, if a user has drilled down several levels into the display hierarchy, the user can select a level (perhaps using the display hierarchy component 265) to drill up to, without having to "back out" of the drill down path level by level. In addition, the user might be given the option to change a value for a parameter corresponding to a particular level, without having to change any of the filter or view criteria. So, for example, if the user is viewing orders for a particular product line placed by a particular company during a particular month, the user can change the value of the month parameter without having to first drill up (i.e., remove the product line and company filters).

In some embodiments, the detail screen also includes a visible component 280 that provides a list of the available actions for the metric being viewed. In a set of embodiment, this visible component 280 can provide an input mechanism (such as a hyperlink, button, etc.) that allows a user to provide input to initiate a particular action. Based on this input, the dashboard application might initiate the action.

In a novel aspect of some embodiments, the dashboard application can be configured to initiate actions that occur outside the dashboard application itself. For instance, in some cases the dashboard application might be configured to invoke a business application that is associated with the data being viewed on the detail screen. Merely by way of example, the illustrated detail screen 250 displays the "on time shipment promised" metric, and an action might be provided to invoke a sales order entry business application to view details about a particular order (or set of orders). In an aspect, the detail screen can be used to provide a context for the action. Merely by way of example, if the user has drilled down to a particular month and a particular company, the action might invoke the sales order entry application to display only orders placed by that company during the month.

Other actions are possible as well. Merely by way of example, the dashboard application might be configured to send an electronic mail message, perhaps to a person (or group of people) responsible for the business process measured by the metric. Once again, the detail screen can provide a context for the message, if desired. Merely by way of example, the message might comprise some of the displayed data, which is categorized and/or filtered according to the selected levels in the display hierarchy at the time the action is initiated. Alternatively and/or additionally, the message might comprise reference (such as a hyperlink, etc.) to the dashboard application and/or the pertinent business application(s), and the reference might refer to the relevant dashboard and/or business application in a context provided by the detail screen (e.g., by invoking the business application in context, as described above and/or by invoking the dashboard application detail screen with the display hierarchy pre-configured). Indeed, the context provided by the selected levels in the display hierarchy might even determine to whom the message is sent. Merely by way of example, if the display hierarchy currently is drilled-down to filter data by a particular company, the sales representative for that company might be included as a recipient of the electronic mail message.

The relationships between various metrics and the responsible parties might be maintained by the dashboard application and/or might be obtained from the relevant business application(s). Merely by way of example, a business application might include a table that correlates various plants with the people who are the plant managers for those locations. In other cases, the metric data itself might reflect a responsible person (e.g., a record for a particular sales order might indicate the name of the sales representative who entered the order or is otherwise responsible for the order). Other data sources, such as human resources applications and/or databases, might be used as well by the dashboard application to identify recipients of the message.

Figure 3:
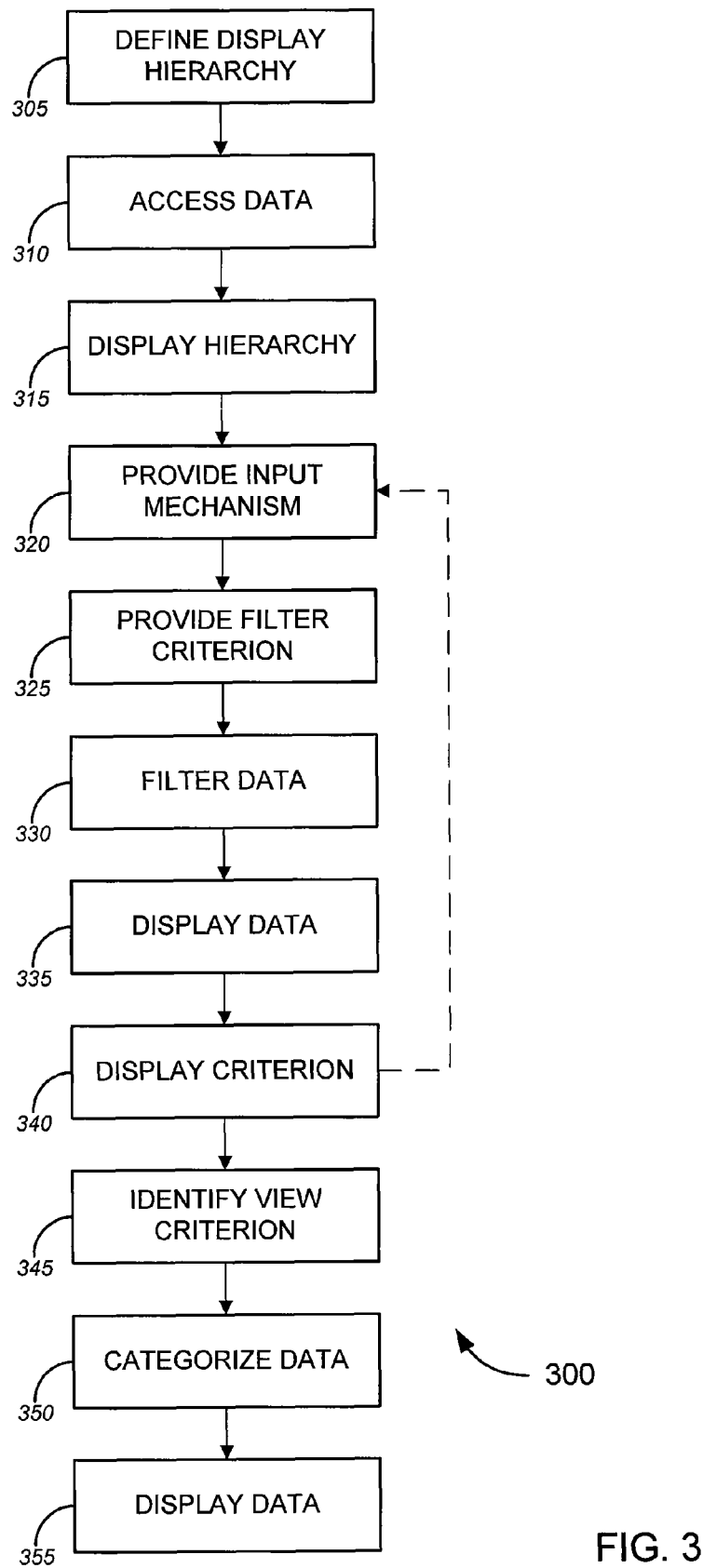
FIG. 3 is a flow diagram illustrating a method of displaying data using a display hierarchy, in accordance with various embodiments of the invention.

FIG. 3 is a flow diagram illustrating a method 300 of displaying data using a display hierarchy, in accordance with various embodiments of the invention. In one embodiment, the method comprises defining a display hierarchy (block 305). Defining a display hierarchy might comprise providing an input mechanism to allow a user to select one or more parameters to be levels in the display hierarchy, receiving input via the input mechanism, and defining the display hierarchy based on the received input. In some cases, the user might be given the opportunity to define, for a given parameter, a relative position in the display hierarchy for the level corresponding to that parameter. An exemplary method for defining (or generating) a display hierarchy in accordance with some embodiments is provided by FIG. 4, described below.

After a display hierarchy has been defined (e.g., by a user, as a default display hierarchy, etc.), the dashboard application accesses and/or obtains the relevant data (block 310). In many cases, this operation is performed by interfacing with a data store and/or a business application to obtain the necessary data. The display hierarchy is then displayed (block 315), perhaps as a hierarchical list of levels in a display component, as described above with respect to FIG. 2B, for example. In a set of embodiments, the display hierarchy comprises a plurality of levels, each of which corresponds to a parameter by which the data can be categorized. Hence, as described above, the display hierarchy provides a drill-down path by which at least a portion of the set of data can be viewed at varying levels of granularity (e.g., by filtering the data according to the parameters corresponding to the levels of the display hierarchy).

The dashboard application provides an input mechanism to allow a user to select a level in the display hierarchy (block 315). This input mechanism might be provided by making the levels in the display hierarchy selectable (e.g., as hyperlinks, etc.) (block 320). In an aspect of some embodiments, as described above, the input mechanism can allow the user to arbitrarily select levels, for example by selecting any of the plurality of levels in the display hierarchy without having to first select a higher level in the display hierarchy and/or by allowing the user to select any level above the first level without having to first select a level immediately higher than the first level.

In an aspect, the input mechanism will allow the user to identify the selected level as a filter criterion. Hence, in this manner, the user can provide a filter criterion for the display of the metric (block 325). Merely by way of example, the user can be provided with an input mechanism (such as text box, etc.) to specify a value for the parameter. This value will then be used as the filter criterion. The dashboard application then filters the data according to the filter criterion (block 330), such that only records having a data element with the particular for that parameter being included in the display of the metric (and/or the calculation of the metric for display). The filtered data (and/or, more particularly, the metric, as calculated based on the filtered data) is displayed, perhaps in a second visible component (block 335). Hence, displaying the data (and/or the metric) might comprise displaying only the filtered data. In some embodiments, the filter criterion is also displayed for the user (block 340), for example, by displaying the value next to the corresponding level in the displayed hierarchy, as illustrated on FIG. 2B. This process can be repeated as desired for any number of levels in the display hierarchy (as indicated by the broken line on FIG. 3).

In some cases, an input mechanism may be used to allow the user to identify a view criterion by which the data should be categorized (block 345). After the user provides input to identify the view criterion, the data can be categorized according to this criterion, and the metric, thus categorized, can be displayed (block 350).

Figure 4:
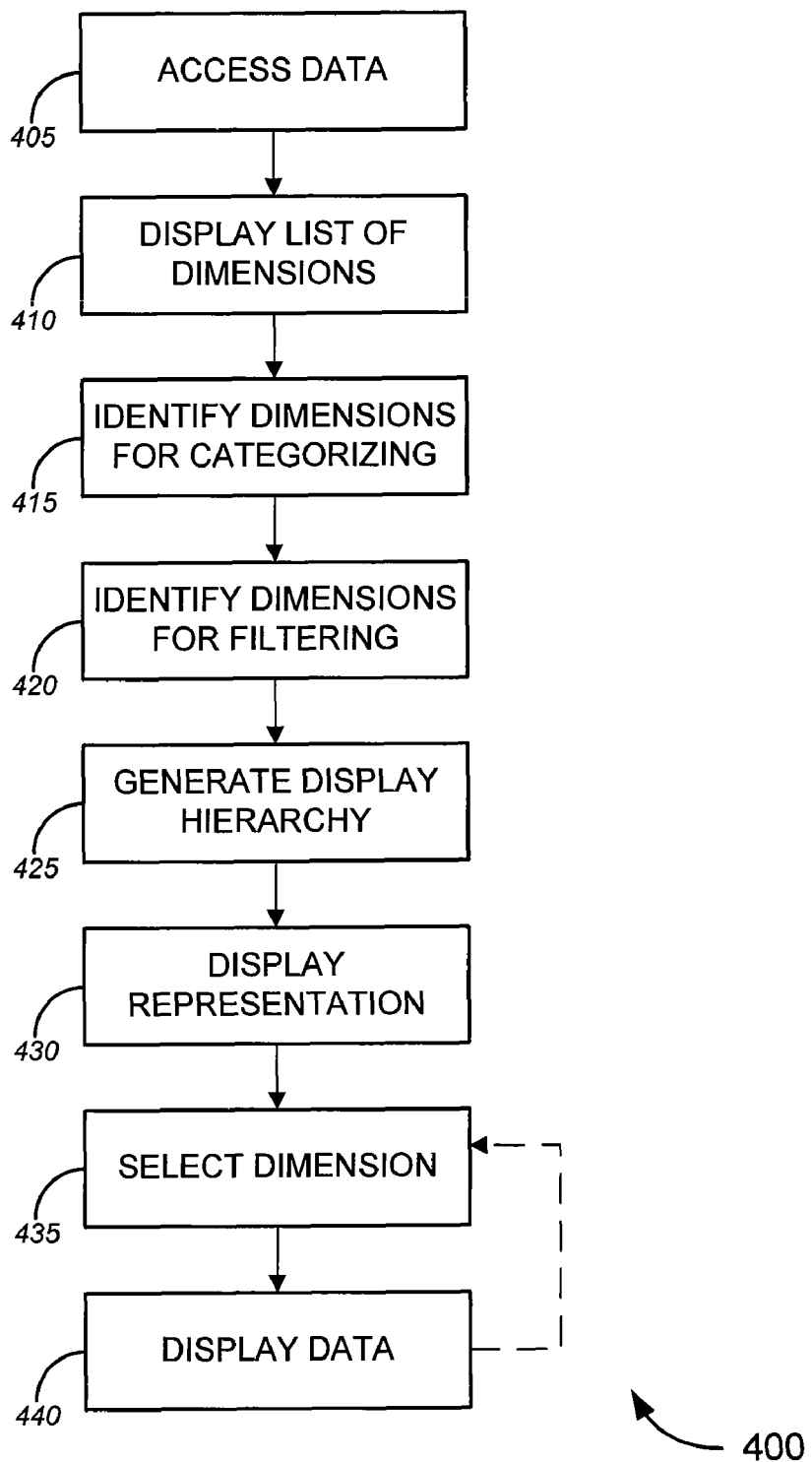
FIG. 4 is a flow diagram illustrating a method of generating a display hierarchy, in accordance with various embodiments of the invention.

FIG. 4 is a flow diagram illustrating a method 400 of generating a display hierarchy, in accordance with various embodiments of the invention. The method comprises accessing a set of data (e.g., at a data store associated with one or more business applications) (block 405). The data might comprise a plurality of records, each of which comprises a plurality of data elements; each data element in a record might have one or more dimensions. Based on this data, the dashboard application displays a list of available dimensions (block 410) and provides an input mechanism to allow the user to select one or more of the dimensions as view criteria (i.e., identify dimensions for categorizing the data) (block 415). Similarly the dashboard application might provide an input mechanism to allow the user to select one or more dimensions as filter criteria (i.e., identify dimensions for filtering the data) (block 420). Merely by way of example, the dashboard application might display a window (or web page, etc) showing each of the dimensions in the data set, and provide two check boxes (one for filter criterion and one for view criterion) for each dimension. By selecting the desired checkboxes, the user can identify the criteria. (It should be noted that a given dimension can be identified as both a view criterion and a filter criterion).

Based on input received from the user (e.g., via the input mechanisms), the dashboard application generates a display hierarchy for displaying the set of data (block 425) and displays (perhaps in a visible component, such as the visible component 265 of FIG. 2B) a representation of the display hierarchy (block 430). The dashboard application can then provide an input mechanism to allow the user to select a dimension from the display hierarchy for categorizing and/or filtering the data (block 435), and the data can be displayed, according to the selected view and/or filter criteria (block 440), for example as described with respect to FIG. 3. As noted above, multiple levels in the display hierarchy can be selected for filtering and/or categorizing the data in this way.

Figure 5:
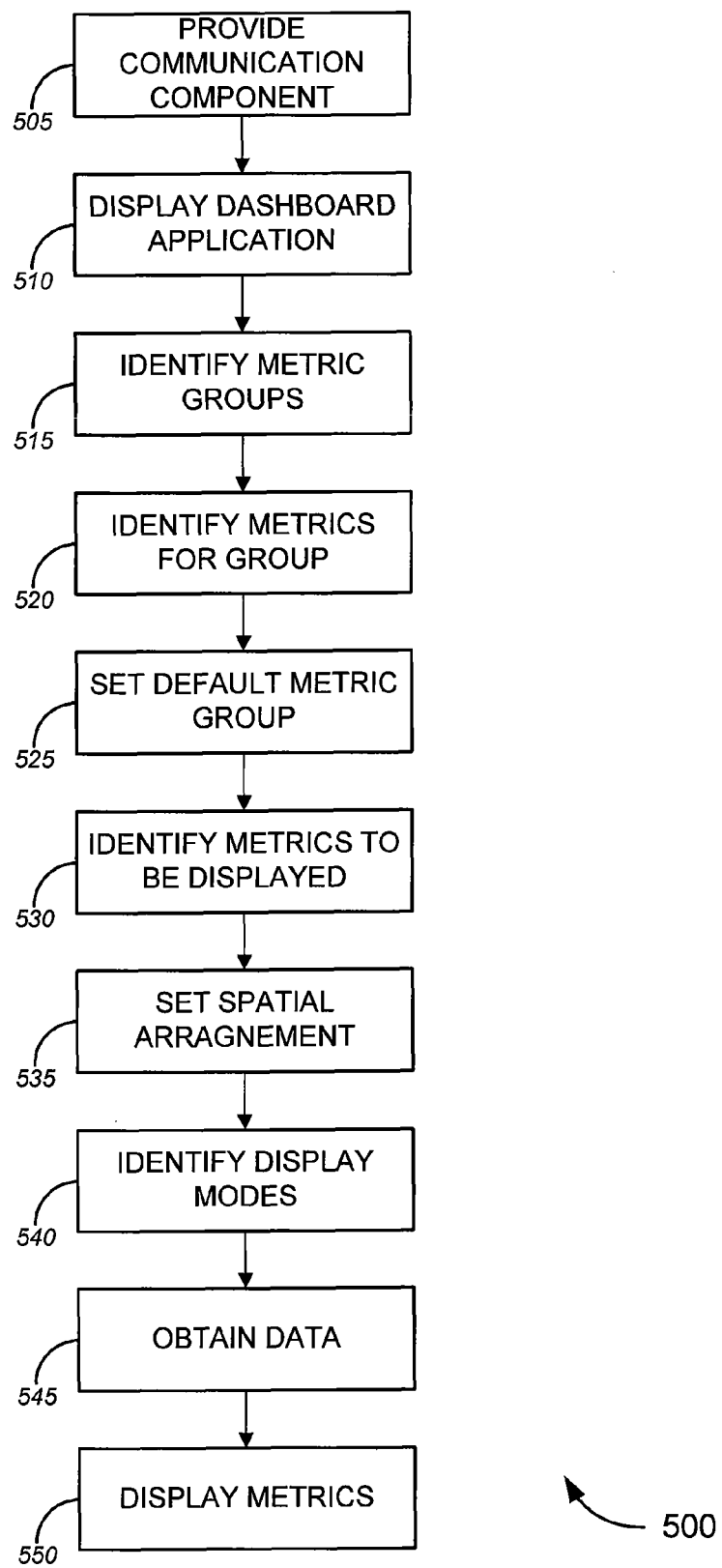
FIG. 5 is a flow diagram illustrating a method of configuring a metric summary screen in a dashboard application, in accordance with various embodiments of the invention.

FIG. 5 is a flow diagram illustrating a method 500 of configuring a metric summary screen in a dashboard application, in accordance with various embodiments of the invention. The method 500 comprises providing a communication component (block 505) (such as the data interface described above, for example). The communication component might be in communication with a business application (and/or, more particularly, a data store associated with the business application) and/or configured to obtain data from the business application. The method 500 further comprises displaying a dashboard application for a user (block 510). The dashboard application might comprise a plurality of visible components (such as the visible components depicted on FIGS. 2A and 2B above).

The method 500 further comprises identifying metrics to be displayed on a summary screen. In some cases, identifying the metrics comprises identifying a metric group (block 515) from among a list of configured metric groups. An input mechanism, such as the mechanism 205 illustrated on FIG. 2A can be used for this purpose.

Figure 6:
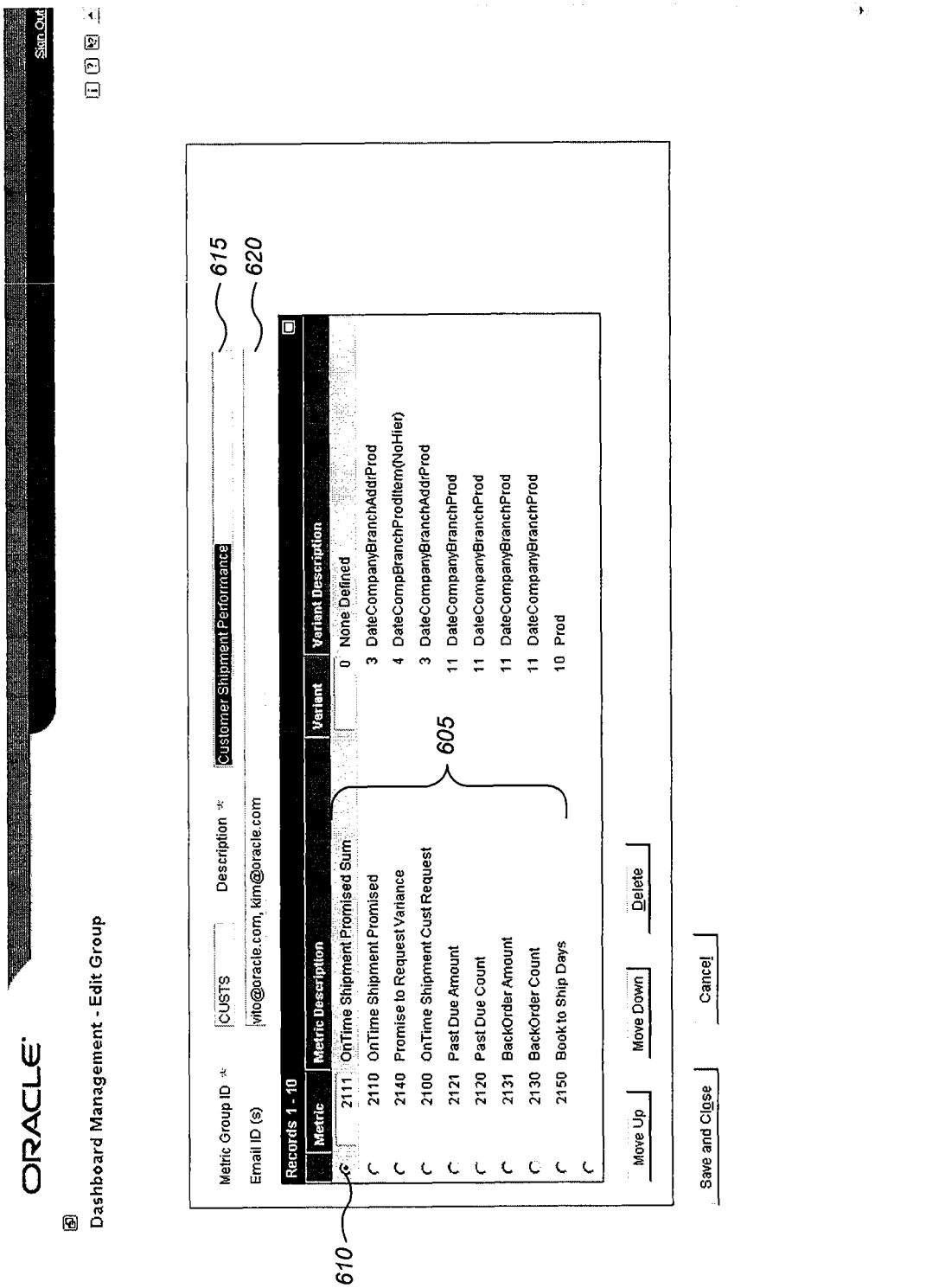
FIG. 6 is screen capture diagram illustrating a metric group configuration interface from a dashboard application, in accordance with various embodiments of the invention.

In particular embodiments, the dashboard application will provide a metric grouping interface to allow a user to configure metric groups. In some cases, configuring metric groups comprises creating a metric group and/or identifying a group of metrics that should be in a particular metric group (block 520). Merely by way of example, FIG. 6 illustrates a metric grouping interface 600 that can be used to identify metrics for a particular group. The interface 600 comprises a list of available metrics 605, along with a set of input mechanisms (e.g., input mechanism 610) for selecting a particular metric to be part of the group. The interface 600 also includes an input mechanism 615 that allows the user to provide a name for the metric group, as well as an input mechanism 620 that allows the user to provide a list of responsible persons for the metric (this list can be used by the dashboard application, for example, to determine responsible persons in taking actions, sending alerts, etc.).

Returning to FIG. 5, the method 500 includes providing an input mechanism to allow a user to identify a default metric group (block 525). In this way, the user can identify which metrics should be displayed on a summary screen upon initialization of the dashboard application.

At block 530, the dashboard application provides an input mechanism for the user to identify a metric to be displayed in a first visible component. This procedure can be repeated as desired, for example to allow the user to identify a second metric to be displayed in a second visible component, etc. The number of metrics to be displayed generally is limited only by the number of available metrics and/or the available screen real estate. (In some cases, it should be noted, that the metric group interface 600 of FIG. 6 can be used to allow the user to identify these metrics. In other cases, metric groups might not be used, and the user can be provided with a facility to identify metrics for display on an individual basis, such that blocks 515-525 can be omitted.)

The user can also be provided with an input mechanism to specify a spatial arrangement of the displayed metrics (block 535) (or, more particularly, of the visible components that are used to display the metrics) (block 530). In other words, the user can specify the order in which the metrics should appear on a summary screen. The user can also be provided with an input mechanism to identify a display mode for each of the metrics to be displayed (block 540).

After input has been received to identify the metrics to be displayed (and, optionally, the spatial arrangement and/or display modes of the metrics), the dashboard application obtains data (from the data store) for generating and/or displaying the metrics (block 545). The metrics, or information about the metrics, is then displayed according to the input received from the user (block 550).

Figure 7:
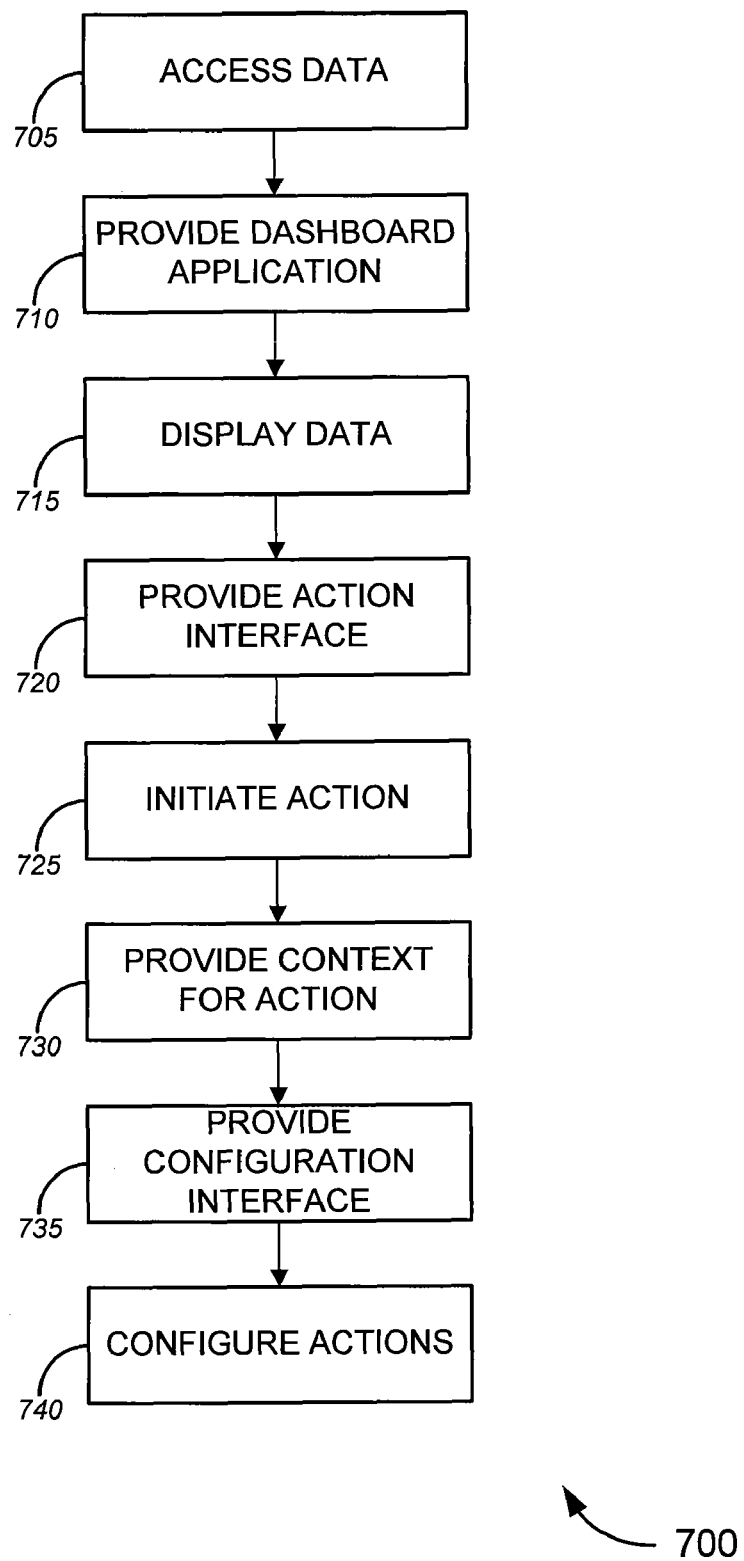
FIG. 7 is a flow diagram illustrating a method of generating actions in a dashboard application, in accordance with various embodiments of the invention.

FIG. 7 is a flow diagram illustrating a method 700 of generating actions in a dashboard application, in accordance with various embodiments of the invention. The method 700 comprises accessing a set of data produced by one or more business application (e.g, as described above) (block 705) and providing a dashboard application (block 710). The dashboard application, as noted above, is configured to display at least some of the data and comprises one or more visible components for this purpose. As noted above, in many cases, the data obtained by the dashboard will pertain to one or more metrics. Merely by way of example, in some cases, the data might be used to calculate and/or derive a metric, and/or the metric might comprise the data itself.

The method 700, therefore, further comprises displaying at least some of the data (block 715). Because the data generally will pertain to a metric, displaying at least some of the data might comprise displaying the metric, as described above, for example. The method 700 might also comprise providing an action interface (such as the visible component 280 illustrated on FIG. 2B) to allow the user to select an action to be performed with respect to at least a portion of the displayed data (block 720). Upon receiving user input via the interface, the dashboard application will initiate the selected action (block 725). As noted above, a variety of actions can be supported, including, without limitation, invoking a business application, sending an electronic mail message and/or the like. Also as noted above, in many cases, the dashboard application will provide a context for the action (block 730). Merely by way of example, if a user drills down into a metric (for example, using one or more procedures described with respect to FIG. 3), the filtered data displayed according to the drill down path might provide the context for the action.

The dashboard application might also provide a configuration interface to configure one or more actions (block 735). Configuring an action (block 740) can include creating a new action and/or modifying an existing action. If a new action is created, the action might be displayed in the action interface. In some cases, a number of default actions are provided with the dashboard application, and configuring an action might include selecting such a pre-configured action.

Figure 8:
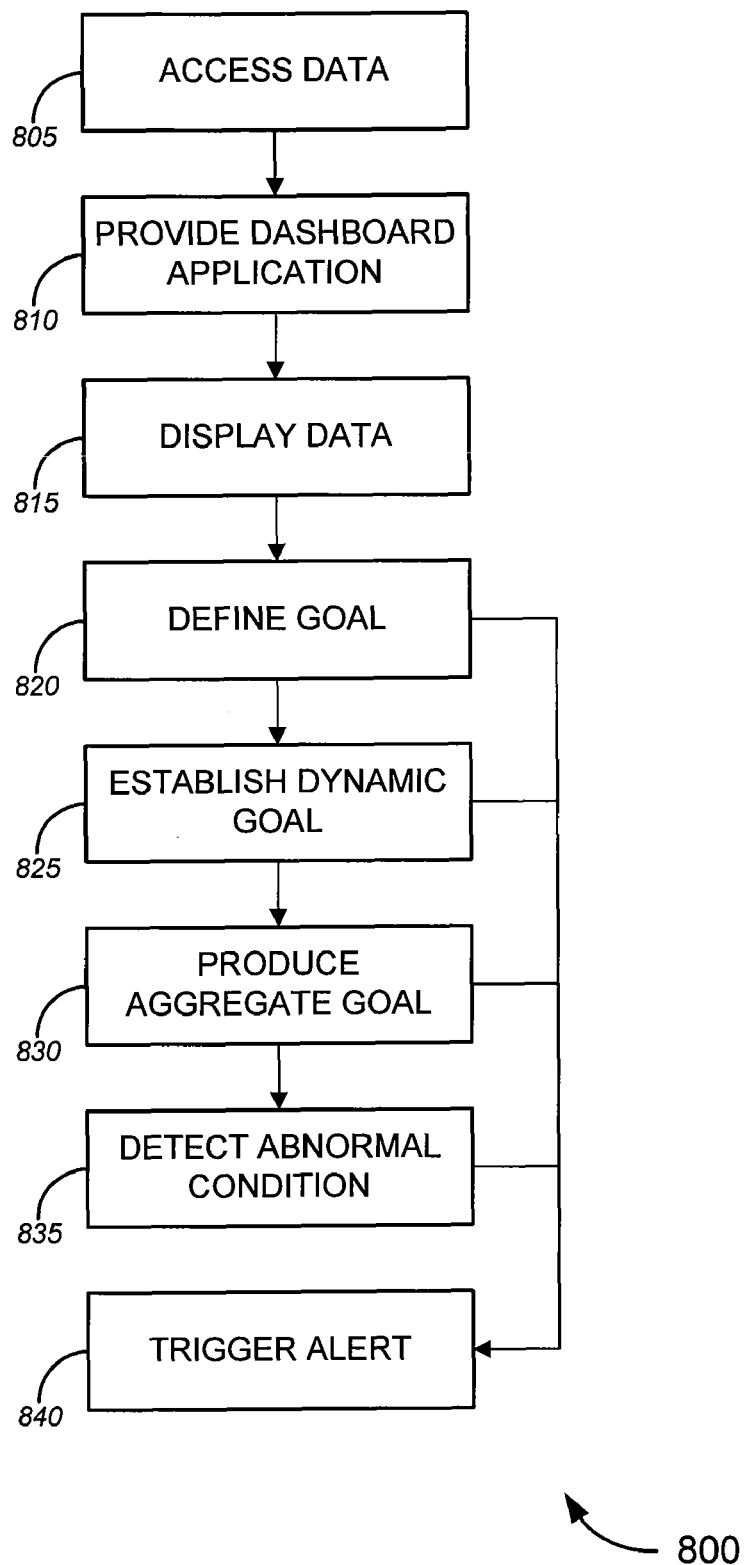
FIG. 8 is a flow diagram illustrating a method of generating alerts in a dashboard application, in accordance with various embodiments of the invention.

FIG. 8 is a flow diagram illustrating a method of generating alerts in a dashboard application, in accordance with various embodiments of the invention. The method 800 comprises accessing a set of data produced by one or more business application (e.g., as described above) (block 805) and providing a dashboard application (block 810). The dashboard application, as noted above, is configured to display at least some of the data and comprises one or more visible components for this purpose. As noted above, in many cases, the data obtained by the dashboard will pertain to one or more metrics. Merely by way of example, in some cases, the data might be used to calculate and/or derive a metric, and/or the metric might comprise the data itself.

The method 800, therefore, further comprises displaying at least some of the data (block 815). Because the data generally will pertain to a metric, displaying at least some of the data might comprise displaying the metric, as described above, for example. As noted above, a metric generally measures an identified business objective. Hence, the method 800 includes providing an interface to allow a user to define a goal for the metric (block 820). The goal generally will identify a threshold value for the metric. The threshold value generally will depend on the nature of the metric itself. Merely by way of example, if the metric measures unfulfilled orders, the threshold value might indicate a maximum number of unfulfilled orders. Conversely, if the metric measures plant output, the threshold might indicate a minimum number of items output. If the goal is not being met, this indicates that the business processes being evaluated by the metric are not performing at the desired level.

Hence, if the metric does not attain the goal, an alert is triggered (block 840). A number of different types of alerts are possible. Merely by way of example, an alert might comprise sending an electronic mail message to one or more entities responsible for the metric. Alternatively and/or additionally, an alert might comprise a message displayed in the dashboard application. For instance, the summary screen 200 depicted by FIG. 2A includes an alert component 230 that can be sued to display alerts generated by the dashboard application. Generally, the alert component 230 on the summary screen will include alerts pertaining to all of the metrics shown on the summary screen (and possibly alerts pertaining to metrics that are part of metric groups not displayed on the summary screen). In addition, the alert component can display alerts pertaining to any metrics for the user is the responsible party, regardless of whether they are configured in any metric groups.

Alternatively and/or additionally, a detail screen might also include an alert component, which might display only alerts related to the metrics to which the detail screen pertains and/or might display all of the alerts for metrics configured in metric groups and/or for which the user is responsible.

As noted above, however, metrics can be considered according to a number of dimensions, and the dashboard application allows a user to view and/or filter the metric according to any desired number of dimensions. Accordingly, in a set of embodiments, the dashboard application can establish dynamic goals (block 825). Merely by way of example, if the user has drilled down into a metric (for example, using one or more of the procedures described with respect to FIG. 3), the dashboard application can establish a dynamic goal for the filtered data, and can trigger an alert (block 840) when the filtered data indicates that the dynamic goal is not being met.

There are several ways to establish a dynamic goal. Merely by way of example, in some cases, the filtered data will represent a discrete subset of the overall set of data used to calculate the metric. For instance, if the metric measures productivity over yearly periods, the user might drilled down to a particular month. Hence, the filtered data would represent $\frac{1}{12}$ of the overall data used to produce the metric. Accordingly, the dynamic goal might be established to be $\frac{1}{12}$ of the overall defined goal by interpolating from the overall goal. The dashboard application can be configured to perform this type of interpolation automatically, without requiring input from the user.

It should be noted, however, that, because some metrics are cyclical, linear interpolation might be inappropriate in some cases. As an example, manufacturer of toys might expect fourth quarter sales to be significantly higher than sales in other quarters, due to the holiday season. Embodiments of the invention can account for such conditions in multiple ways. First, some embodiments provide an input mechanism to allow a user to input a value for a particular dynamic goal. This value, then, would override any interpolated goals. In some cases, the dashboard would adjust other dynamic goals to maintain consistency with both the input value and the overall defined goal for the metric. Second, other embodiments provide pre-configured interpolation algorithms to account for cyclical metrics. Such algorithms can automatically account for varying values among a particular dimension (such as the case when one plant is expect to produce more output than other plants, etc.).

Conversely, the dynamic goals can be "rolled up" to produce an aggregate goal over some collection of drill down data subsets (block 830). For example, if a metric has a defined goal for an annual period, and the drill down path provides for filtering the data on a monthly basis (thus establishing dynamic monthly goals), the dashboard application can produce an aggregate goal for a time period of multiple months (but less than a year) by aggregating the necessary monthly goals. This aggregate goal can be compared with an aggregate metric generated by aggregating the actual data sets for the pertinent months. If the aggregation of this plurality of data sets indicates that the aggregate goal is not being met, and alert is triggered (block 840).

Other embodiments provide for system alerts. An exemplary system alert might be generated when an abnormal condition (e.g., an equipment failure, etc.) is detected by the dashboard application and/or by a business application. Merely by way of example, one skilled in the art will appreciate that many business application provide interfaces to common manufacturing equipment, and through such interfaces can detect abnormal conditions in such equipment. When such an abnormal condition is detected (block 835), an alert can be triggered (block 840).

Figure 9:
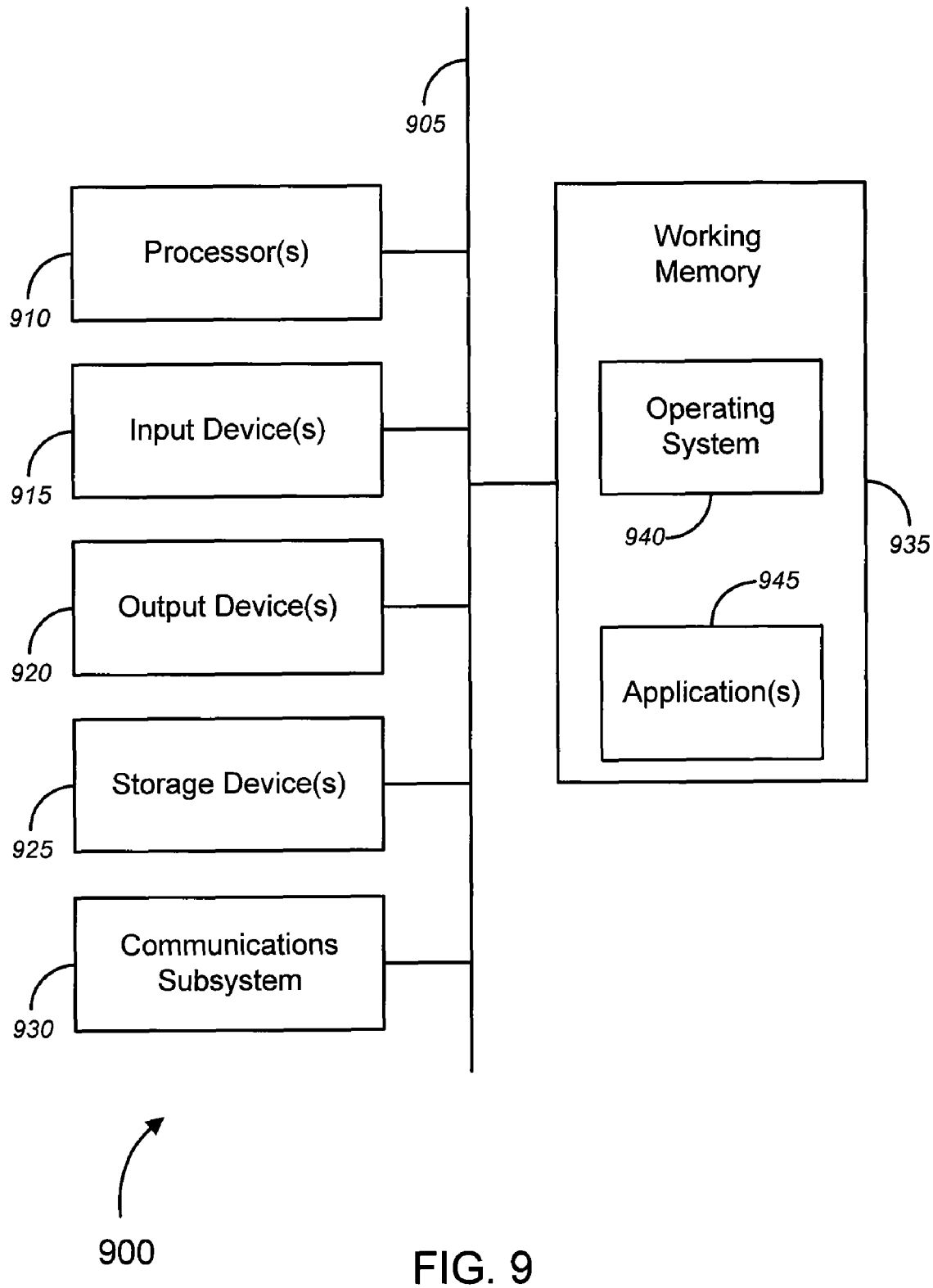
FIG. 9 is a generalized block diagram illustrating a computer system that can be used in various embodiments of the invention.

FIG. 9 provides a schematic illustration of one embodiment of a computer system 900 that can perform the methods of the invention and/or the functions of a dashboard application server, client computer, business application server, database server, and/or the like, as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. The computer system 900 is shown comprising hardware elements that can electrically coupled via a bus 905 (or may otherwise be in communication, as appropriate). The hardware elements can include one or more processors 910, including without limitation one or more general-purpose processors and/or one or more special-purpose processors (such as digital signal processing chips, graphics acceleration chips, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 9 might also include a communications subsystem 930; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 930 may permit data to be exchanged with a network (such as the network 1010 described below, and/or any other devices described herein. In many embodiments, the computer system 900 will further comprise a memory 935, which can include a RAM or ROM device, as described above.

The computer system 900 also can comprise software elements, shown as being currently located within the working memory 935, including an operating system 940 and/or other code 945, such as one or more application programs, which may comprise computer programs of the invention (such as a dashboard application, web server, web browser, etc.) and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 925 described above. In some cases, the storage medium might be incorporated within a computer system, such that the instructions, when executed by the computer system, perform the procedures of the method(s). In other embodiments, the storage medium might be separate from a computer system (i.e., a removable medium, such as a compact disc, etc.), such that the storage medium can be used to program a generic computer with the instructions stored thereon.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 10:
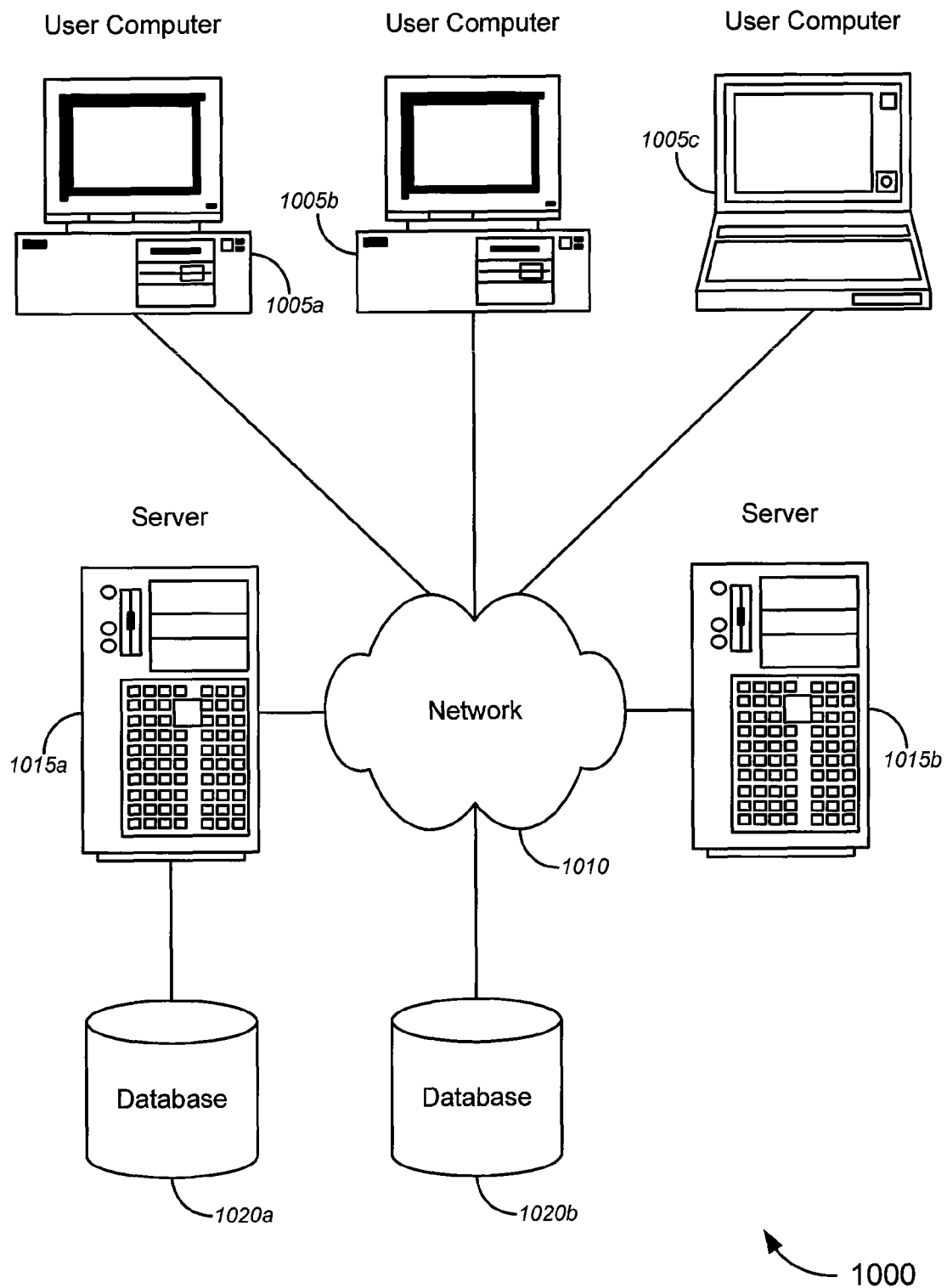
FIG. 10 is a generalized block diagram illustrating a networked system that can be used in various embodiments of the invention.

A set of embodiments comprises systems for implementing a dashboard application. Merely by way of example, FIG. 10 illustrates a schematic diagram of a system 1000 that can be used in accordance with one set of embodiments. The system 1000 can include one or more user computers 1005. The user computers 1005 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 1005 can also have any of a variety of applications, including one or more applications configured to perform methods of the invention, as well as one or more office applications, database client and/or server applications, and web browser applications. Alternatively, the user computers 1005 can be any other electronic device, such as a thin-client computer, Internet-enabled mobile telephone, and/or personal digital assistant, capable of communicating via a network (e.g., the network 1010 described below) and/or displaying and navigating web pages or other types of electronic documents. Although the exemplary system 1000 is shown with three user computers, any number of user computers can be supported.

Certain embodiments of the invention operate in a networked environment, which can include a network 1010. The network 1010 can be any type of network familiar to those skilled in the art that can support data communications using any of a variety of commercially-available protocols, including without limitation TCP/IP, SNA, IPX, AppleTalk, and the like. Merely by way of example, the network 1010 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 1015. Each of the server computers 1015 may be configured with an operating system including without limitation any of those discussed above, as well as any commercially-available server operating systems. Each of the servers 1015 may also be running one or more applications, which can be configured to provide services to one or more clients 1005 and/or other servers 1015.

Merely by way of example, one of the servers 1015 may be a web server, which can be used, merely by way of example, to process requests for web pages or other electronic documents from user computers 1005. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1005 to perform methods of the invention.

The server computers 1015, in some embodiments, might include one ore more file and/or application servers, which can include one or more applications accessible by a client running on one or more of the client computers 1005 and/or other servers 1015. Merely by way of example, the server(s) 1015 can be one or more general purpose computers capable of executing programs or scripts in response to the user computers 1005 and/or other servers 1015, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from database clients running on a user computer 1005 and/or another server 1015. In some embodiments, an application server can create web pages dynamically for displaying the information in accordance with embodiments of the invention, such as dashboard application pages (e.g., summary pages, detail pages, visible components, etc.). Data provided by an application server may be formatted as web pages (comprising HTML, Javascript, etc., for example) and/or may be forwarded to a user computer 1005 via a web server (as described above, for example). Similarly, a web server might receive web page requests and/or input data from a user computer 1005 and/or forward the web page requests and/or input data to an application server.

In accordance with further embodiments, one or more servers 1015 can function as a file server and/or can include one or more of the files necessary to implement methods of the invention incorporated by an application running on a user computer 1005 and/or another server 1015. Alternatively, as those skilled in the art will appreciate, a file server can include all necessary files, allowing such an application to be invoked remotely by a user computer 1005 and/or server 1015. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020. The location of the database(s) 1020 is discretionary: merely by way of example, a database 1020a might reside on a storage medium local to (and/or resident in) a server 1015a (and/or a user computer 1005). Alternatively and/or additionally, a database 1020b can be remote from any or all of the computers 1005, 1015, so long as it can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the computers 1005, 1015 can be stored locally on the respective computer and/or remotely, as appropriate.) In one set of embodiments, a database 1020 can be a relational database, such as an Oracle database, that is adapted to store, update, and retrieve data in response to SQL-formatted commands. The database might be controlled and/or maintained by a database server, as described above, for example. In particular embodiments, the database server might be configured with DBMS software and/or storage management software.

While the invention has been described with respect to exemplary embodiments, one skilled in the art will recognize, based on the disclosure herein, that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of presenting data to a user, the method comprising:

provideing a communication component in communication with a business application, the communication component being configured to obtain data from the business application;

displaying a dashboard application for a user, the dashboard application comprising a plurality of visible components, the plurality of visible components comprising a first visible component and a second visible component;

providing a first input mechanism for the user to identify a first metric to be displayed by the first visible component;

receiving, from the user and via the first input mechanism, an identification of the first metric to be displayed by the first visible component;

providing a second input mechanism for the user to identify a second metric to be displayed by the second visible component;

receiving, from the user and via the second input mechanism, an identification of the second metric to be displayed by the second visible component;

obtaining, from a data store maintained by the business application, a first set of data pertaining to the first metric;

displaying information about the first metric with the first visible component, wherein the first visible component comprises a third input mechanism that is configured to be selected by the user to invoke a third visible component that provides a detailed display of the first set of data, wherein the first set of data comprises a plurality of records, each of the plurality of records comprising a plurality of data elements, and wherein each data element in a record has a corresponding dimension;

displaying, for the user, a list of available dimensions;

providing the third input mechanism to allow the user to select one or more dimensions for categorizing the plurality of records;

receiving, from the user and via the third input mechanism, an identification of a first set of one or more dimensions by which the plurality of records are to be categorized;

providing a fourth input mechanism to allow the user to select one or more dimensions for filtering the first set of data;

receiving, from the user and via the fourth input mechanism, an identification of a second set of one or more dimensions by which the plurality of records are be filtered;

displaying, for the user, a representation of the display hierarchy;

obtaining, from a data store maintained by the business application, a second set of data pertaining to the second metric;

displaying information about the second metric with the second visible component, wherein the first and second metrics provide real-time visibility of operations of the business processes;

generating a display hierarchy for displaying the first set of data in a third visible component, based on the second set of one or more dimensions; and providing a fifth input mechanism to allow the user to select a level in the hierarchy and after the user has selected a first level in the display hierarchy, the fifth input mechanism further allows the user to select any level above the first level without having to first select a level immediately higher than the first level and then allows the user to select any of the plurality of levels in the display hierarchy without having to first select a higher level in the display hierarchy.

2. A method as recited by claim 1, wherein the first visible component comprises a first frame on a web page, and wherein the second visible component comprises a second frame on the web page.

3. A method as recited by claim 1, wherein the first visible component comprises a first window, and wherein the second visible component comprises a second window.

4. A method as recited by claim 1, wherein the first visible component comprises a first portlet on a web page, and wherein the second visible component comprises a second portlet on the web page.

5. The method as recited by claim 1, wherein a first web page comprises the first and second visible components, and wherein a second web page comprises the third visible component.

6. A method as recited by claim 5, wherein invoking the third visible component comprises transmitting the second web page to a web browser for display to the user.

7. The method as recited by claim 1, further comprising providing a sixth input mechanism for the user to specify a spatial arrangement of the first visible component and the second visible component.

8. The method as recited by claim 1, wherein the first and second input mechanisms are incorporated within a metric grouping interface that allows the user to create a metric group of two or metrics that should be displayed together.

9. A method as recited by claim 8, further comprising:

receiving, from the user and via the metric grouping interface, an identification of a first metric group, the first metric group comprising one or more metrics; and receiving, from the user and via the metric grouping interface, an identification of a second metric group, the second metric group comprising one or more metrics.

10. The method as recited by claim 9, further comprising:

providing an interface for the user to select a metric group as a default metric group;

receiving input, from the user and via the interface; and based on the input, setting one of the metric groups as the default metric group, such that, upon initialization of the dashboard application, information about the one or more metrics in the default metric group will be displayed.

11. The method as recited by claim 9, further comprising:

providing an interface for the user to select a metric group to be displayed; and receiving input, from the user and via the interface, identifying the first metric group; and based on the input received via the interface, displaying information about the metrics in the first metric group;

wherein the first metric group comprises the first metric and the second metric, such that displaying information about the metrics in the first metric group comprises the displaying information about the first metric with the first visible component and the displaying information about the second metric with the second visible component.

12. The method as recited by claim 1, further comprising:
providing a first interface for the user to identify a first display mode for the first visible component; and
providing a second interface for the user to identify a second display mode for the second visible component;
wherein displaying information about the first metric comprises displaying information according to the first display mode and displaying information about the second metric comprises displaying information according to the second display mode.

13. A method as recited by claim 12, wherein the first display mode comprises a display style selected from the group consisting of a bar chart, a pie chart, a line plot, and a data table, and wherein the second display mode comprises a display style selected from the group consisting of a bar chart, a pie chart, a line plot, and a data table.

14. A method as recited by claim 1, wherein the dashboard application is implemented as a portlet on a web page comprising information other than the dashboard application.

15. A system, comprising:
means for providing a communication component in communication with a business application, the communication component being configured to obtain data from the business application;
means for displaying a dashboard application for a user, the dashboard application comprising a plurality of visible components, the plurality of visible components comprising a first visible component and a second visible component;
means for providing a first interface for a user to identify a first metric to be displayed by the first visible component;
means for receiving, from the user and via the first interface, an identification of the first metric to be displayed by the first visible component;
means for providing a second interface for the user to identify a second metric to be displayed by the second visible component;
means for receiving, from the user and via the second interface, an identification of the second metric to be displayed by the second visible component;
means for obtaining, from a data store maintained by the business application, a first set of data pertaining to the first metric;
means for displaying information about the first metric with the first visible component, wherein the first visible component comprises a third input mechanism that is configured to be selected by the user to invoke a third visible component that provides a detailed display of the first set of data, wherein the first set of data comprises a plurality of records, each of the plurality of records comprising a plurality of data elements, and wherein each data element in a record has a corresponding dimension;
means for displaying, for the user, a list of available dimensions;
means for providing the third input mechanism to allow the user to select one or more dimensions for categorizing the plurality of records;
means for receiving, from the user and via the third input mechanism, an identification of a first set of one or more dimensions by which the plurality of records are to be categorized;
means for providing a fourth input mechanism to allow the user to select one or more dimensions for filtering the first set of data;
means for receiving, from the user and via the fourth input mechanism, an identification of a second set of one or more dimensions by which the plurality of records are be filtered;
means for displaying, for the user, a representation of the display hierarchy;
means for obtaining, from a data store maintained by the business application, a second set of data pertaining to the second metric;
means for displaying information about the second metric with the second visible component, wherein the first and second metrics provide real-time visibility of operations of the business processes;
means for generating a display hierarchy for displaying the first set of data in a third visible component, based on the second set one or more of dimensions; and
means for providing a third input mechanism to allow the user to select a level in the hierarchy and after the user has selected a first level in the display hierarchy, the third input mechanism further allows the user to select any level above the first level without having to first select a level immediately higher than the first level and then allows the user to select any of the plurality of levels in the display hierarchy without having to first select a higher level in the display hierarchy.

16. A computer system comprising:
a processor;
a communication interface; and
a non-transitory computer readable medium, the non-transitory computer readable medium comprising a set of instructions executable by the processor, the set of instructions comprising:
instructions to provide a communication component in communication with a business application, the communication component being configured to obtain data from the business application;
instructions to display a dashboard application for a user, the dashboard application comprising a plurality of visible components, the plurality of visible components comprising a first visible component and a second visible component;
instructions to provide a first interface for a user to identify a first metric to be displayed by the first visible component;
instructions to receive, from the user and via the first interface, an identification of the first metric to be displayed by the first visible component, wherein the first visible component comprises a third interface that is configured to be selected by the user to invoke a third visible component that provides a detailed display of the first set of data, wherein the first set of data comprises a plurality of records, each of the plurality of records comprising a plurality of data elements, and wherein each data element in a record has a corresponding dimension;
instructions to display, for the user, a list of available dimensions;
instructions to provide the third input interface to allow the user to select one or more dimensions for categorizing the plurality of records;
instructions to receive, from the user and via the third input interface, an identification of a first set of one or more dimensions by which the plurality of records are to be categorized;

instructions to provide a fourth input interface to allow the user to select one or more dimensions for filtering the first set of data;

instructions to receive, from the user and via the fourth input interface, an identification of a second set of one or more dimensions by which the plurality of records are to be filtered;

instructions to display, for the user, a representation of the display hierarchy;

instructions to provide a second interface for the user to identify a second metric to be displayed by the second visible component;

instructions to receive, from the user and via the second interface, an identification of the second metric to be displayed by the second visible component;

instructions to obtain, from a data store maintained by the business application, a first set of data pertaining to the first metric;

instructions to display information about the first metric with the first visible component;

instructions to obtain, from a data store maintained by the business application, a second set of data pertaining to the second metric;

instructions to display information about the second metric with the second visible component, wherein the first and second metrics provide real-time visibility of operations of the business processes;

instructions to generate a display hierarchy for displaying the first set of data in a third visible component, based on the second set of one or more dimensions; and instructions to provide a fifth interface to allow the user to select a level in the hierarchy and after the user has selected a first level in the display hierarchy, the fifth interface further allows the user to select any level above the first level without having to first select a level immediately higher than the first level and then allows the user to select any of the plurality of levels in the display hierarchy without having to first select a higher level in the display hierarchy.

17. A computer system as recited by claim 16, wherein the computer system comprises a server computer, the server computer being in communication with a client computer, and wherein the instructions to display the information about the first and second metrics comprise instructions to transmit information to the client computer for displaying the first and second visible components, and wherein the instructions to provide the first and second interfaces comprise instructions to provide the first and second interfaces on the client computer.

18. A computer system as recited by claim 17, wherein the server computer comprises a web server and the client computer comprises a web browser, and wherein the first and second visible components, and the first and second interfaces, are provided by the web server to the web browser.

19. A non-transitory computer readable medium having stored thereon a set of instructions executable by one or more processors, the set of instructions comprising:

instructions to provide a communication component in communication with a business application, the communication component being configured to obtain data from the business application;

instructions to display a dashboard application for a user, the dashboard application comprising a plurality of visible components, the plurality of visible components comprising a first visible component and a second visible component;

instructions to provide a first interface for a user to identify a first metric to be displayed by the first visible component;

instructions to receive, from the user and via the first interface, an identification of the first metric to be displayed by the first visible component, wherein the first visible component comprises a third interface that is configured to be selected by the user to invoke a third visible component that provides a detailed display of the first set of data, wherein the first set of data comprises a plurality of records, each of the plurality of records comprising a plurality of data elements, and wherein each data element in a record has a corresponding dimension;

instructions to display, for the user, a list of available dimensions;

instructions to provide the third input interface to allow the user to select one or more dimensions for categorizing the plurality of records;

instructions to receive, from the user and via the third input interface, an identification of a first set of one or more dimensions by which the plurality of records are to be categorized;

instructions to provide a fourth input interface to allow the user to select one or more dimensions for filtering the first set of data;

instructions to receive, from the user and via the fourth input interface, an identification of a second set of one or more dimensions by which the plurality of records are be filtered;

instructions to display, for the user, a representation of the display hierarchy;

instructions to provide a second interface for the user to identify a second metric to be displayed by the second visible component;

instructions to receive, from the user and via the second interface, an identification of the second metric to be displayed by the second visible component;

instructions to obtain, from a data store maintained by the business application, a first set of data pertaining to the first metric;

instructions to display information about the first metric with the first visible component;

instructions to obtain, from a data store maintained by the business application, a second set of data pertaining to the second metric;

instructions to display information about the second metric with the second visible component, wherein the first and second metrics provide real-time visibility of operations of the business processes;

instructions to generate a display hierarchy for displaying the first set of data in a third visible component, based on the second set of one or more dimensions; and instructions to provide a fifth interface to allow the user to select a level in the hierarchy and after the user has selected a first level in the display hierarchy, the fifth interface further allows the user to select any level above the first level without having to first select a level immediately higher than the first level and then allows the user to select any of the plurality of levels in the display hierarchy without having to first select a higher level in the display hierarchy.

* * * * *

UNITED STATES PATENT AND TRADEMARK OFFICE
CERTIFICATE OF CORRECTION

| | | |
|---|---|---|
| PATENT NO. | : 8,161,394 B2 | |
| APPLICATION NO. | : 11/746178 | |
| DATED | : April 17, 2012 | |
| INVENTOR(S) | : Gu et al. | |

It is certified that error appears in the above-identified patent and that said Letters Patent is hereby corrected as shown below:

On cover page, item (75), in column 1, under "Inventors", line 9, delete "Rich," and insert -- Ranch, --, therefor.

In the drawings: On sheet 6 of 11, in figure 5, Box no. 535, line 2, delete "ARRAGNEMENT" and insert -- ARRANGEMENT --, therefor.

In column 3, line 46, delete "my" and insert -- may --, therefor.

In column 3, line 49, delete "my," and insert -- may, --, therefor.

In column 3, line 63, after "page" insert -- . --.

In column 5, line 10, delete "Buesingess" and insert -- Business --, therefor.

In column 16, line 4, delete "modern," and insert -- modem, --, therefor.

In column 17, line 37, delete "ore" and insert -- or --, therefor.

In column 19, line 57, in Claim 1, after "are" insert -- to --.

In column 20, line 14, in Claim 2, delete "A" and insert -- The --, therefor.

In column 20, line 18, in Claim 3, delete "A" and insert -- The --, therefor.

In column 20, line 21, in Claim 4, delete "A" and insert -- The --, therefor.

In column 20, line 29, in Claim 6, delete "A" and insert -- The --, therefor.

In column 20, line 41, in Claim 9, delete "A" and insert -- The --, therefor.

Signed and Sealed this
Twenty-fourth Day of July, 2012

David J. Kappos
*Director of the United States Patent and Trademark Office*

In column 21, line 15, in Claim 13, delete "A" and insert -- The --, therefor.

In column 21, line 21, in Claim 14, delete "A" and insert -- The --, therefor.

In column 22, line 6, in Claim 15, after "are" insert -- to --.

In column 22, line 19, in Claim 15, delete "one or more of" and insert -- of one or more --, therefor.

In column 23, line 43, in Claim 17, delete "A" and insert -- The --, therefor.

In column 23, line 53, in Claim 18, delete "A" and insert -- The --, therefor.

In column 24, line 31, in Claim 19, after "are" insert -- to --.